(12) United States Patent
McCormack et al.

(10) Patent No.: US 6,535,983 B1
(45) Date of Patent: Mar. 18, 2003

(54) SYSTEM AND METHOD FOR SIGNALING AND DETECTING REQUEST FOR POWER OVER ETHERNET

(75) Inventors: Michael S. McCormack, Gloucester, MA (US); Paul Francis Dryer, Medway, MA (US); Nicholas Mark Stapleton, Uxbridge (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/435,722

(22) Filed: Nov. 8, 1999

(51) Int. Cl.[7] .............................. G06F 1/26; G06F 3/00; H04L 12/28
(52) U.S. Cl. ........................ 713/310; 370/410; 710/15
(58) Field of Search .................. 713/310, 15; 370/908, 370/410

(56) References Cited

U.S. PATENT DOCUMENTS 5,991,885 A * 11/1999 Chang et al. ................. 710/62
5,994,998 A * 11/1999 Fischer et al. .......... 340/310.01
6,016,519 A * 1/2000 Chida et al. ................. 340/635
6,115,468 A * 9/2000 De Nicolo .................. 379/413
6,366,143 B1 * 4/2002 Liu et al. .................... 327/142

* cited by examiner

Primary Examiner—Thomas Lee
Assistant Examiner—Suresh K Suryawanshi
(74) Attorney, Agent, or Firm—McGlew and Tuttle, P.C.

(57) ABSTRACT

According to the invention, an Ethernet system and method of using an Ethernet system is provided including a network side device (a hub/switch/concentrator), and a plurality of end devices (either a standard end device powered locally or a system powered device), connected to the hub/switch. The system powered devices have circuitry for indicating the system power need to the hub, which has a power source for selectively supplying system power over the Ethernet. A stimulus device associated with the network device sends a stimulus signal over the network connection lines during a detection phase. The need for power is signaled by an indication device associated with the system powered end devices, providing an indication signal in response to the stimulus signal. A detector associated with the network side detects the indication signal thus triggering the power source to supply system power to each of the end devices that is a system powered device and not to each of the end devices that is a standard device.

20 Claims, 10 Drawing Sheets

The DTE End
Detection Phase

- Operates on voltages from 2.5 to 5V.
- Alternates from near zero current to a programmable current draw.
- Operational power supply is removed from the current path.
- Current draw profile is distinctive.

The DTE End
Operation Phase

- Oscillator is protected from power voltage.
- Current flows only through the power supply.
- The current flow must be monitored to detect over and and under draw conditions.

SYSTEM AND METHOD FOR SIGNALING AND DETECTING REQUEST FOR POWER OVER ETHERNET

FIELD OF THE INVENTION

The invention relates generally to Ethernet applications and more particularly to providing a signal connection and power connection to a device via a hub and Ethernet twisted pair wiring.

BACKGROUND OF THE INVENTION

Network devices typically communicate via wired data lines and receive power from a separate line. For example, personal computers ("PCs") may communicate Ethernet signals via category three (CAT-3) or category five (CAT-5) twisted pair wire and receive power from a second cable connected to a power source, such as a wall socket or a battery. However, it is desirable to be able to eliminate the need for the second cable.

Plain old telephone service ("POTS") combines a voice signal with a power signal. The combined signal is transmitted over twisted pair cable between the telephone and the line card at the public telephone exchange office. The line card also supplies power over the two wires carrying the voice signal. However, the voice signal supported by POTS is not sufficient for bandwidth intensive communications needs, such as, Ethernet communications. Similarly, ISDN communications transmit power and digital data between an ISDN modem and a telephone switch. However, ISDN data rates are more than an order of magnitude lower than Ethernet data rates.

Providing power to an end device (computer, Ethernet phone, peripheral device, etc.) using the Ethernet twisted pair wiring is desirable in many situations. Providing power locally (powering an end device at its location) presents problems for Ethernet applications. One example of a problem encountered is the security camera problem wherein the local supply of power can be problematic as to the secure status of such a security camera. A possible solution is to provide the transmission medium as a medium for supplying power (the Ethernet wire is used for supplying power). However, this involves some problems as well.

Wireless network adapters can interconnect PCs, or other networked device. The wireless network adaptors use, for example, infrared (IR) or radio frequency (RF) modulation to transmit data between wireless access points and the wireless adaptors connected to PCs. Although the wireless adaptors and wireless access points may be more expensive than comparable wired equipment, they provide savings in wiring costs and permit greater flexibility by allowing the PCs to be moved to any location within the range of the system without the necessity of rewiring the building.

Typically, a transceiver (meaning transmitter and receiver) called a wireless access point, mounted at an elevated location, such as on a ceiling or high on a wall, provides network data communications between a network hub, switch, router or server, to all the PCs located in that room which are equipped with a compatible wireless networking adaptor. The wireless access point is an active electronic device that requires a communications link to a hub or server as well as electrical power to operate. Both the data signal and power signal must be provided to the wireless access point. The data signal is typically at a lower voltage than the power signal, but at a significantly higher frequency, sufficient to sustain a high data transfer rate (e.g., 100 kilobits per second or higher). The available power is usually 110V or 220V AC at frequencies below one hundred Hz. Often two separate sets of wires are used to carry the data signal and power signal. One set of wires is used to couple the wireless access point and the hub and the other set of wires is used to couple the wireless access point to the power outlet.

Eliminating the need for separate power and data wiring simplifies the installation of a wireless access point and can reduce the cost of the installation. Therefore, it is desirable to transmit sufficient electrical power to operate the wireless access point through the network cable that is used to connect the wireless access point to the hub or server.

One possible solution is to transmit power on the unused wires of the data cable. An example of this approach can be found in the VIPSLAN-IOTM product manufactured by the JVC Information Products Company of Irvine, Calif. Of course this requires that additional, unused wire pairs be available in the data cable, which may not always be available. Also, if a change in the networking standard in the future dictates the use of the currently unused wire pairs in the networking cable, this solution becomes difficult to implement.

Therefore, what is needed is a solution that reduces the wiring requirements to transmit data and power to a wireless access point without having to use additional wire pairs.

At this time, the IEEE 802.3 standard (Ethernet) does not address power issues. One possibility for supplying power is to provide the power on the Ethernet connection, namely the transmission medium. The issues as to supplying power involve issues as to the environment of the system as well as in the overall costs.

Typically in Ethernet environments power is applied locally at a hub or concentrator and this unit distributes power to various network devices which are connected to slots of the hub or concentrator. However this approach does not take into account problems involving unusual environments or needs to have the network device at a distant location from the hub. The standard does not provide for hubs which supply power to other devices, the IEEE 802.3 working group is attempting to develop a standard that addresses this, but it is not in the standard yet.

Another network device which has been increasingly used in network environments is a network phone. Such a phone device converts audio analog signals into digital signals and sends the digital signals out in the form of packets over a network such as a local area network (LAN). The phone devices can be provided with a power circuit which is integrated into the phone. The AC power is applied to the phone and the power is conditioned (e.g. rectified) and possibly also converted by a transformer. The use of such discrete power supplies, one power supply associated with each telephone unit, provides an expense and further complication to such telephone systems.

A changeover from the approach of supplying power locally to a system involving supplying power via the network wires involves various problems including the need to condition the power supplied over the wire. One significant problem is the need to supply the power over the network wires at a relatively high voltage level. For example, the use of 45 volts dc over the wire is considered to be advantageous. However, the use of high voltage levels results in higher cost with regard to semiconductor devices used in the network device. Typically, voltage levels below 30 volts are desirable with regard to maintaining semiconductor unit costs at a low level. Semiconductor devices which use higher voltage levels typically result in higher costs.

Besides the issues as to supplying power, any effort to add functionality to existing Ethernet standards must be compatible with existing equipment compliant with IEEE 802.3 (relating to carrier sense multiple access (CSMA) local area network applications). Current termination practices in the industry place a passive resistor is a very low wattage (1/10 W) between signal pairs that are targeted for power insertion. If power is blindly applied to the Ethernet cable, it would damage equipment that uses the passive resistor termination. In the alternative, the power must be limited to less than 1/10 W (this is impractical). It therefore is significantly important that a safe and effective method of signaling and detecting the need for power, of a particular end device, be provided for powering the Ethernet cable.

SUMMARY AND OBJECTS OF THE INVENTION

It is an object of the invention to provide an Ethernet system with a hub having an associated power source for selectively supplying system power over Ethernet twisted pair wiring to end devices and for detecting the indication of the system power need and supplying system power to each of the end devices that is a system powered device and for not supplying system power to each of the end devices that is a standard device.

It is another object of the invention to provide a system which can be used with existing end devices which allows power and a data signal to be provided over the Ethernet twisted pair connection and also allows existing equipment to be used in this system, without problems resulting.

It is another object of the invention to provide a system including a hub/switch/concentrator which can provide a data signal and can also provide power to an end device connected to the hub/switch/concentrator by Ethernet twisted pair lines. This system provides that they hub/switch/concentrator can determine if the end device is to be provided with power and the appropriate data signal or if the end device is only to be provided with the appropriate data signal and which hub/switch/concentrator provides normal Ethernet connection capability and as needed also provides power over the same Ethernet twisted pair lines.

According to the invention, an Ethernet system and method ofusing an Ethernet system is provided including a network side device (a hub/switch/concentrator), Ethernet twisted pair wiring for carrying data signals and a plurality of end devices connected by the Ethernet twisted pair wiring to the hub/switch. Each end device is either a standard end device powered locally or a system powered device. The standard device is connectable with the hub/switch via the twisted pair wires carrying Ethernet data signals. The standard end device includes a passive resistor termination to associated twisted pair wires carrying Ethernet data signals. The system powered device is connectable to the hub/switch via associated twisted pair wires carrying Ethernet data signals. The system powered devices have circuitry for indicating the system power need to the hub. A power source for selectively supplying system power over the Ethernet twisted pair wiring is associated with the hub. A stimulus device is associated with the network device (e.g., associated with the power source). The stimulus device sends a stimulus signal over the network connection lines during a detection phase. The need for power is provided by an indication device associated with the system powered end devices. The indication device provides an indication signal on respective network connection lines in response to the stimulus signal. The indication signal is different from the stimulus signal. A detector is associated with the network side device. The detector detects the indication signal indicating the system power need and the power source supplies system power to each of the end devices that is a system powered device and does not supply system power to each of the end devices that is a standard device.

The invention provides a system in which a stimulus may be sent out by the hub/switch (or some device on the network side) and devices which require system power provide a unique response which is different from a response provided by standard end devices. The invention preferably provides that the stimulus is different from the response. As the network side contains only a stimulator, this is not to generate the response. At the end device side or terminal side there is a response by system powered end devices only when stimulated.

The system of the invention preferably addresses the problems of existing termination schemes of the standard devices. These have a low ohm to ground, namely through 1/10 W resistors. The solution according to the invention also preferably addresses the issue that existing termination schemes have pairs directly shorted. The invention also preferably deals with the issue of a possible misconnection where there is no standard cross over or other than a standard RJ-45 patch cord is used. Invention can also address issues as to cable damage, cuts and partial cuts in the Ethernet wiring, shorts in Ethernet wiring as well as safety issues in supplying power to the system powered devices.

According to another aspect of the invention, a system is provided for providing an Ethernet connection for Ethernet data signals and to supply power over twisted pair wires carrying Ethernet data signals. The system includes a hub/switch with an associated variable power source with current sense. The Hub is connectable to end devices via Ethernet twisted pair lines. The hub/switch can be operated in a detection mode in which the variable power source oscillates between a first low voltage and a second low voltage. The variable power source detects current draw in the twisted pair wires carrying Ethernet data. An end device is connectable to the hub/switch via the twisted pair wires carrying Ethernet data signals. The end device has a device for allowing current flow at the second low voltage and for substantially not allowing current flow at the first low voltage whereby the current sense of the power source senses a current draw which is non linear to indicate the device is to be powered by the power source.

According to a further aspect of the invention a process is provided using the system according to the invention. The process includes providing a hub/switch including a variable power supply. End devices are also provided. The end devices are either of a standard type with passive resistor termination or the end device is a device to be powered. Devices to be powered are provided with a device for substantially not allowing current flow at a first low voltage and for allowing current flow at a second low voltage. The process provides that the variable power supply enters a power off state. This power off state is entered either by default or the state is entered upon detecting a connection condition at the end device side of the system (e.g. upon detecting that an end device has been connected by Ethernet twisted pair of lines). In the power off state the power supply oscillates between providing the first low voltage and the second low voltage. The second voltage is greater than the first low voltage. Preferably, according to the system of the invention, the first low voltage and the second low voltage are less than five volts, such that the application of this voltage to the standard type end device will not damage such standard type end device. The variable power supply associated with the hub/switch is also provided with a current sense feature. This current sense circuitry contacts the current flow through the end device. When the two voltages are applied to the standard type end device, there is no significant change in the current draw, or the change is linear. When the two voltages are applied to the device to be powered, there is no appreciable current flow through the end device when the first low voltage is applied. When the second low voltages applied there is a current flow through circuitry of the end device to be powered. The current sense circuitry detects a step function in the current draw which is non-linear. This indicates something other than the passive termination at the end device. The process provides at the hub/switch enters a power on state such that power is applied to the Ethernet cable and the end device to be powered.

The end device to be powered preferably includes a Zener diode resistor arrangement in parallel with the load of the device. Zener diode is selected such that there is no appreciable current flow through the diode when the first low voltages applied. The Zener diode is also selected such that there is a current flow through the Zener diode when the second low voltage is applied.

According to another aspect of the invention a power source is provided on a network side or is associated with a hub/switch. The power source applies e.g., 2.2 VDC (volts direct current) across the two pairs of a particular Ethernet connection. The power source or circuitry associated with the power source measures the current through the particular Ethernet connection. If the measured current is greater than 45 milliamps, power is removed as this indicates a short. If the measured current is less than 45 milliamps and is at a constant value power is removed as this indicates passive termination, namely that the end device connected to the particular Ethernet connection is a standard end device. If the current measured is oscillating current, this indicates that a system powered device is connected to the particular Ethernet connection and power is applied. Specifically, for the particular Ethernet connection, the power source goes into a powered state. The system provides that during the powered state the current draw is constantly monitored. If the current draw becomes too high, this indicates a short or failure and power is removed. If the current draw becomes to low, this indicates a disconnection or a failure and power is removed.

In many of the embodiments according to the invention, the stimulus signal, issued by the network side (hub/switch), is preferably below five volts. This value is used to avoid the possibility of damage to a standard device. Specifically, the application to the voltage much higher than five volts would necessarily cause damage to the circuitry of such a standard device. In an example according to the invention, the stimulus voltages preferably above 2.5 volts. Particularly, the voltage of at least 1.2 volts or more is required as a very low voltage can e.g., below 1.2 volts, is so low that many semiconductor devices won't conduct.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
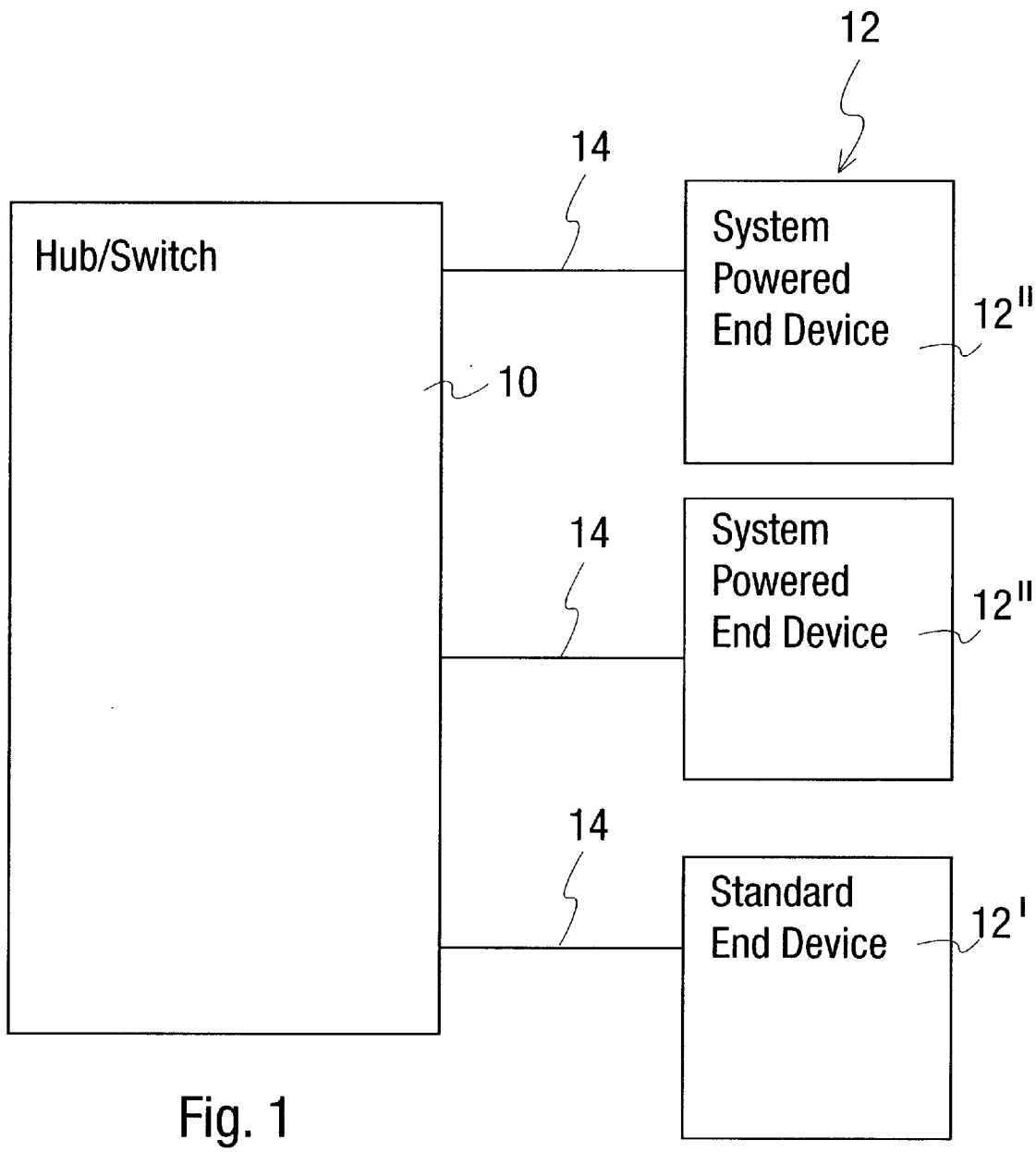
FIG. 1 is a circuit diagram of the system of the invention showing end devices connected to a network system Hub/Switch.

Referring to the drawings in particular, the invention comprises a system that utilizes a network side device such as a hub or switch (or concentrator) 10. The hub/switch 10 may have several ports, each providing a connection to an end device 12 via an Ethernet twisted pair wiring cable 14 or some other network device (potentially including another hub/switch 10). The end devices 12 may be connected and disconnected as needed. The hub or switch 10, the Ethernet twisted pair wiring cables 14, and end devices 12 together define a local area network (e.g., 10 Mbits/s Ethernet, 100 Mbits/s Ethernet and/or 1 gigibits/s Ethernet). Data packets are transmitted from the end stations 12, over the Ethernet twisted pair wiring cable 14 and through the hub or switch 10 to the various end devices 12.

The end devices may be locally powered end devices 12', devices of a standard or typical type. These may have a passive resistor termination or may have pairs directly shorted. The end devices may also be system powered end devices 12" powered by a power source 50 on the network system side (e.g., associated with the Hub/switch 10), through the Ethernet twisted wiring 14. Such an end device 12" or 12' or a combination of these two types of end devices 12 may be used in the system of the invention.

Figure 2:
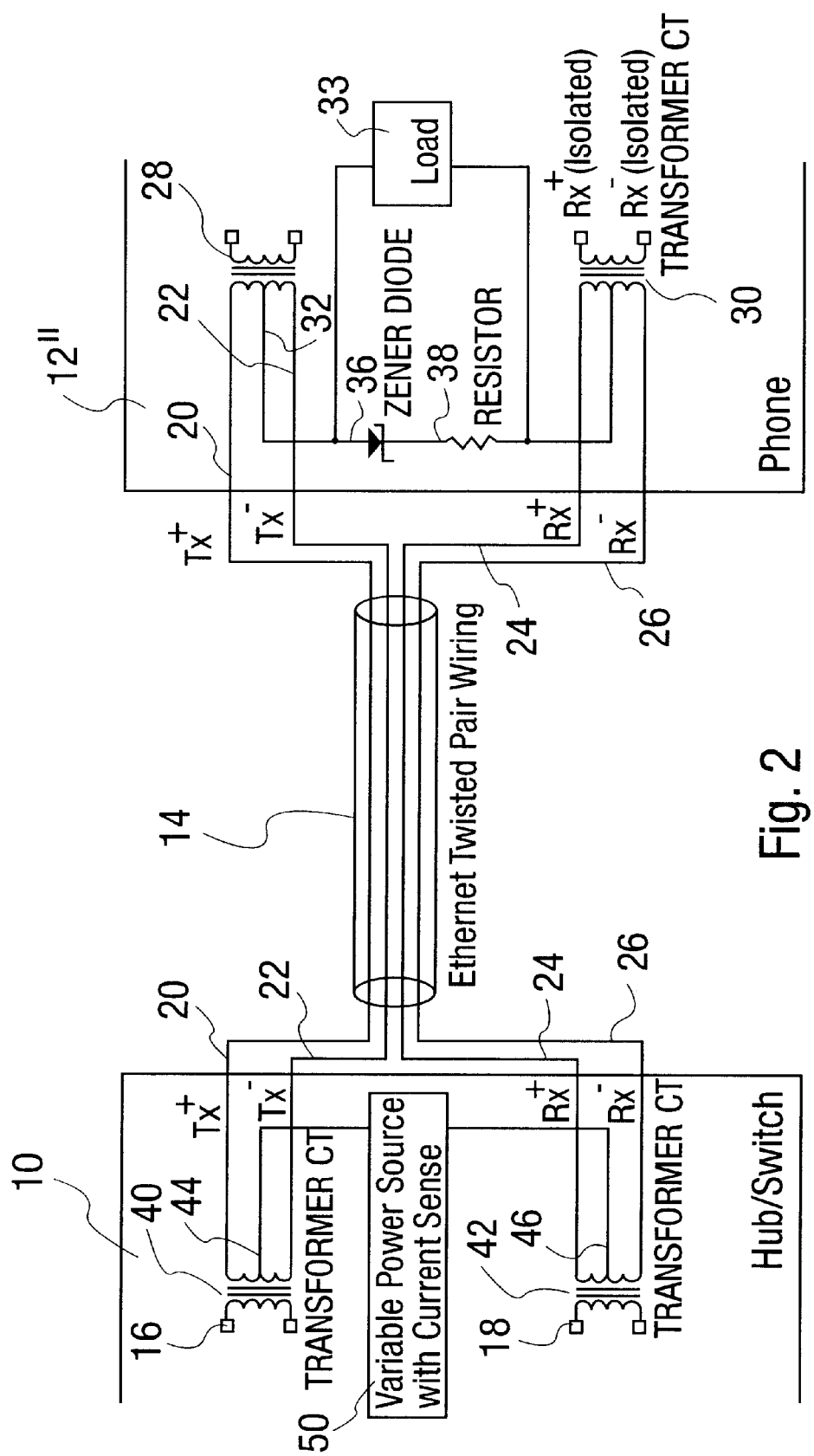
FIG. 2 is a circuit diagram showing interconnection features of the Hub/Switch and a powered device according to a first embodiment of the invention.

In FIG. 2, the end device 12" is a phone which sends Ethernet packets for effecting the communication. The end devices 12" can be some other device such as a video camera, an audio/video input device, a computer, a terminal or a peripheral device. The system contemplates that the hub 10, which is connected to end devices 12, is not initially aware of how the end device 12 is powered.

The end device 12', which is powered locally, has a passive resistor of very low wattage (1/10 watt.). Applying power of a high voltage could damage the device. Such a device has its own power supply and a connection to a power source.

The device 12" shown in FIG. 2, is to be powered via the Ethernet twisted pair or 14. The device is connected to the transmission and receiving lines of the Ethernet twisted pair line 14, namely Tx+line 20, Tx−line 22, RX+line 24 and Rx−line 26. Isolation transformers such signal transformers 28 and 30 are used for isolating a transceiver from the communications medium. This separates the transmitter and receiver of an Ethernet card or similar device (e.g. network interface card or NIC) from the pair wire.

The center tap 32 of the transformer 28 is connected to a load 33 which in turn is connected to the center tap 34 of transformer 30. Additionally, the invention provides this load 33 is connected in parallel with a Zener diode 36 and resistor 38.

The hub/switch 10 is provided with or is associated with the variable power source 50. Power source 50 is used to supply the system power to end devices 12" during an operation phase or power phase for each port connected to an end device 12". The hub includes a transformer 40, associated with each port, which isolates the transmitter and related circuitry 16 from the Ethernet twisted pair wiring 14. The transformer 40 is connected to the lines 20 and 22. Additionally, the transformer 40 has a central tap 44 connected to the variable power source 50. A transformer 42 is also provided, associated with each port which isolates the receiver and related circuitry 18 from the Ethernet listed pair are 14. The transformer 42 is also connected to the Ethernet twisted pair wiring line 24 and line 26. The transformer 42 is connected to central to tap 46 which is connected to the variable power source 50.

Figure 3:
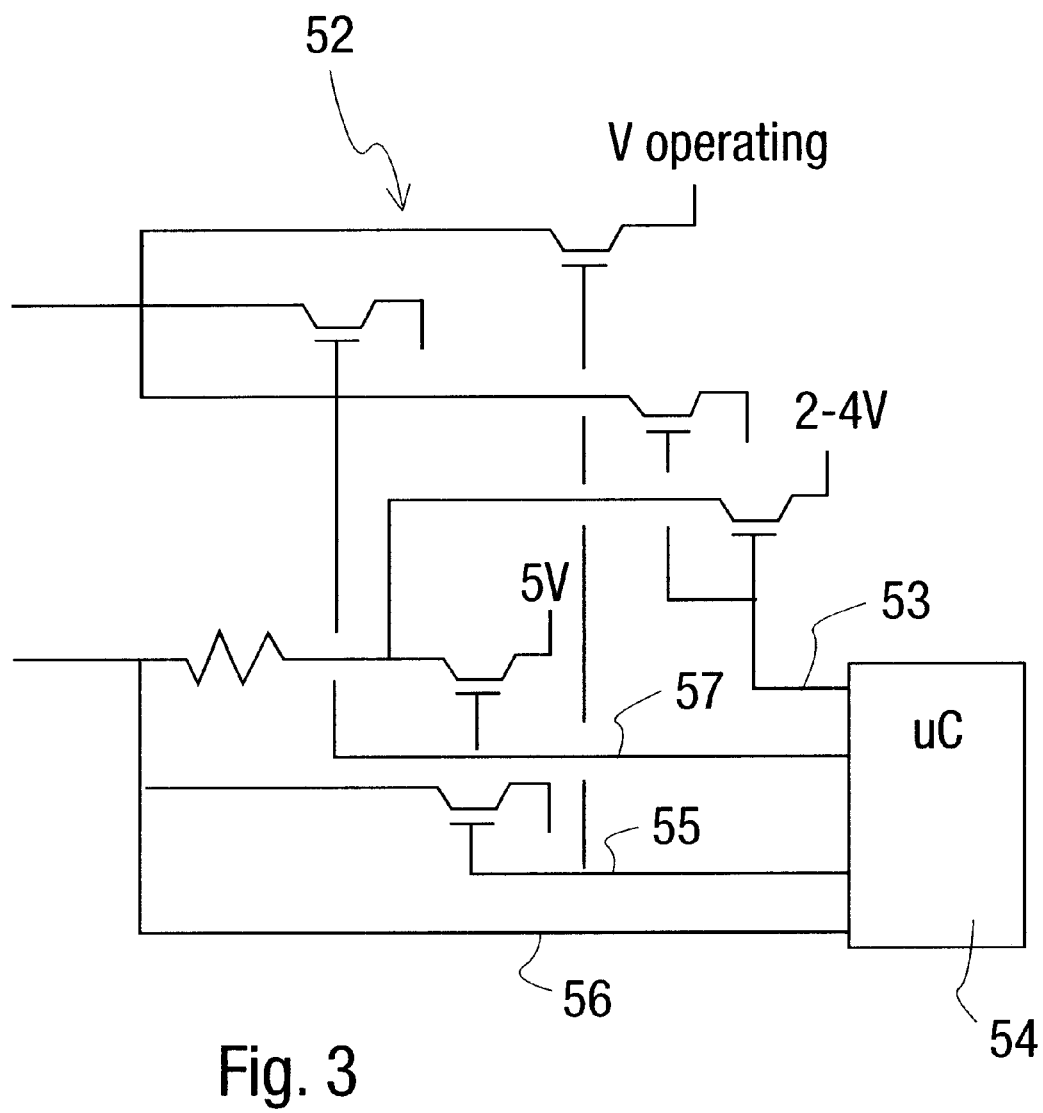
FIG. 3 is a circuit diagram showing the current sensing circuit 3 according to the first embodiment of the invention.

The variable power supply 50, according to the invention is provided with current sensing circuitry 52 which detects current flowing through an end device 12. As shown in FIG. 3, the current sensing circuitry 52 is associated with a controller 54 for setting the voltages which are to be applied across the Ethernet twisted pair wiring 14. With one control line 53 a first voltage level A (e.g. about 2 volts) is applied across wiring 14. With another control line 55 another low voltage level B is applied. The sensing circuitry 52 is provided such that with a system powered end device 12" present, connected to wiring 14, the sensing line 56 sees the lower voltage at the sensing circuitry 52. However, at the second low voltage level (e.g. just below 5 volts), the sensing line 56 sees a voltage drop, indicating the presence of the system powered end device 12" (this is described further below).

With this arrangement, the hub or switch 10 can be provided such that in a default state or upon detecting a connection condition on the load side (on the end device side) it enters a power off state. In the power off state the power supply oscillates between providing the two differing low voltage levels on a particular port's Ethernet twisted pair wiring 14. These two voltage levels must be less than about five volts. In this way, an end device 12' which is not powered by the system (a device which is powered locally) upon connecting to the hub 10, will not be damaged.

The first low voltage level A, first voltage level below five volts, is lower than a second global to B which is a second voltage level below or near five volts. The Zener diode 36 is selected according to the system of the invention so that there is no appreciable current flow through the diode 36 when the voltage A is applied. This Zener diode 36 is selected for end devices 12", according to be invention, such that there is a current flow through the Zener diode 36 when voltage B is applied.

Upon entering the default state or detecting the connection condition, as noted above, the hub/switch 10 switches between the first applied low voltage A and the second, higher applied low voltage B. The current sensing circuitry 52 of variable power source 50 detects a step function in the current draw of the end device 12 which is not linear. This indicates to the hub/switch 10 that the end device 12, connected over the particular Ethernet twisted pair wiring 14, is an end device 12". Accordingly, the hub/switch 10 then enters a power on state with the variable power source 50 applying full power to the Ethernet cable 14 via power control line 57 from the controller 54. First and second Ethernet transmission lines 20 and 22 are provided which carry a signal including a 60 Hz ISO 48 V potential component and a series superimposed communication pulse (e.g. +/−2 V) component. Similarly, first and second Ethernet receiving lines 24 and 26 are provided which carry a signal including a 60 Hz ISO 48 V potential component and a series superimposed communication pulse (e.g. +/−2 V) component.

The process of the invention uses the system according to the invention. The process includes providing the hub/switch 10 including the variable power supply 50. The end devices 12 are also provided and are connected to the hub 10 via the Ethernet cables 14. The end devices 12 are either of a standard type 12' with passive resistor termination or the end devices are devices 12" to be powered via the cable connection 14. Devices 12" to be powered via the network connection are provided with a circuitry 36, 38 for substantially not allowing current flow at a first low voltage and for allowing current flow at a second low voltage.

The process provides that the variable power supply 50 enters a power off state. This power off state is entered either by default or the state is entered upon detecting a connection condition at the end device side of the system (e.g. upon detecting that an end device 12 has been connected by Ethernet twisted pair of lines). In the power off state the power source 50 oscillates between providing the first low voltage A and the second low voltage B. The second low voltage B is greater than the first low voltage A. Preferably, according to the system of the invention, the first low voltage A and the second low voltage B are less than five volts, such that the application of this voltage to the standard type end device 12' will not damage such standard type end device 12'. The variable power supply 50 associated with the hub/switch 10 is also provided with a current sense feature. This current sense circuitry contacts the current flow through the end device 12. When the two voltages are applied to the standard type end device 12', there is no significant change in the current draw, or the change is linear. When the two voltages are applied to the device 12" to be powered, there is no appreciable current flow through the end device 12" when the first low voltage is applied. When the second low voltage B is applied there is a current flow through circuitry 36, 38 of the end device 12" to be powered. The current sense circuitry detects a step function in the current draw which is non-linear. This indicates something other than the passive termination at the end device. The process provides that the power source 50 of the hub/switch 10 enters a power on state such that power is applied to the Ethernet cable 14 and the end device 12" to be powered. The device 12' does not get powered (no voltage above 5V is applied). The data signals may be sent over the system to either type of end device 12' and 12".

Figure 4:
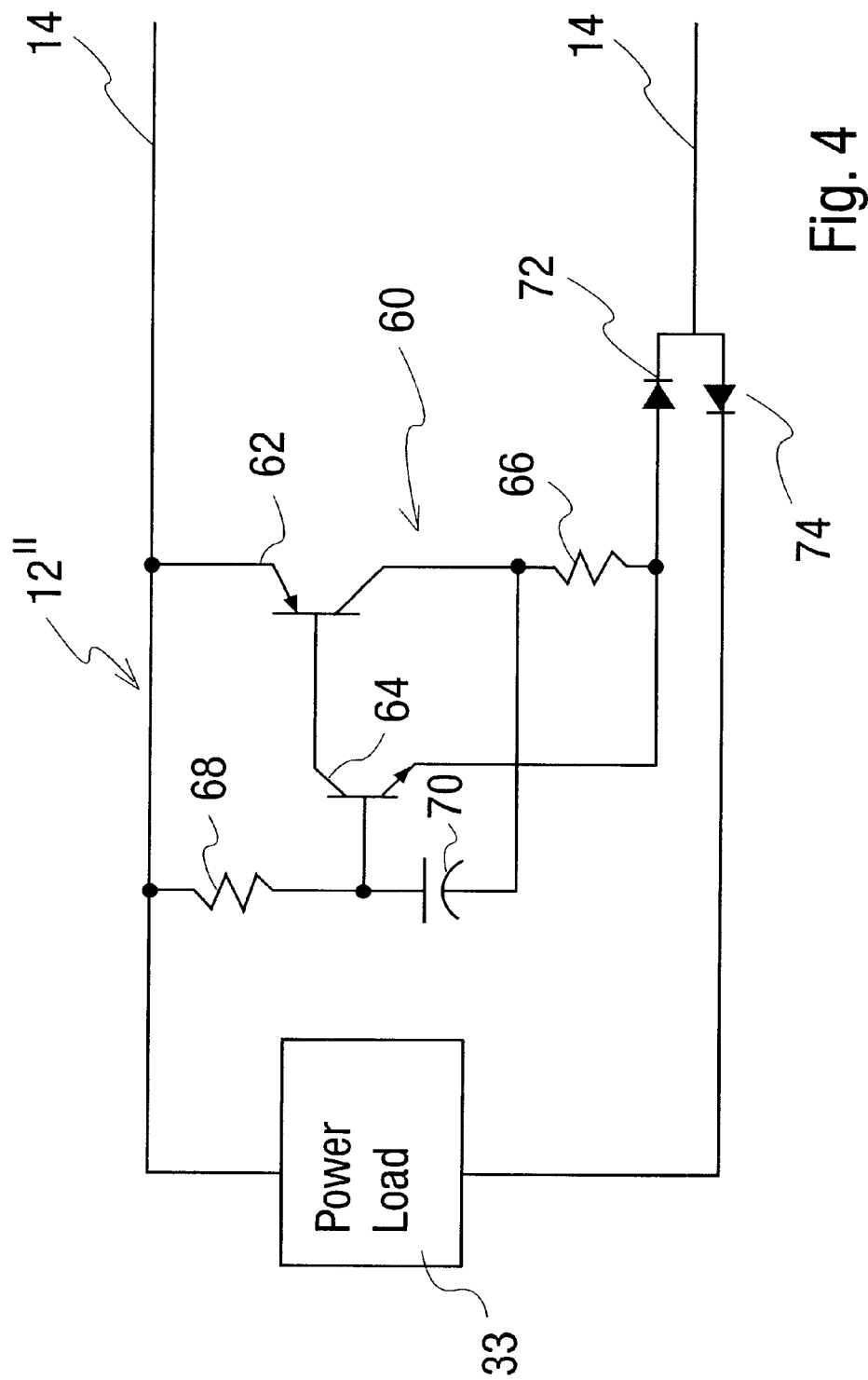
FIG. 4 is a circuit diagram showing features associated with the end device requiring system power according to a second embodiment of the invention.

FIG. 4 shows a circuit arrangement associated with an end device 12" according to a second embodiment of the invention. The end device 12" includes structure for providing an indication of its need for system power based on the network side sending out a stimulus. An important feature according to each of the embodiments of the invention is that the stimulus is preferably different from the response or indication provided by the end device 12" to be provided with system power. This avoids the problem of a hub/switch receiving an indication from another hub/switch were in the indication is actually the stimulus provided by the other hub/switch.

According to the second embodiment, the end device 12" includes connections to the Ethernet wiring lines generally designated 14 in FIGS. 4–7. Indication circuitry 60 is provided including a pnp transistor 62, a npn transistor 64, resistor 68, capacitor 70 and another resistor 66 connected at shown. This indication arrangement 60 is connected via a diode 72 between a receive and transmit side of the Ethernet wiring 14. Another diode 74 is provided in series with the load 33 and connected to the transmit and receive side of the Ethernet wire 14.

Figure 5A:
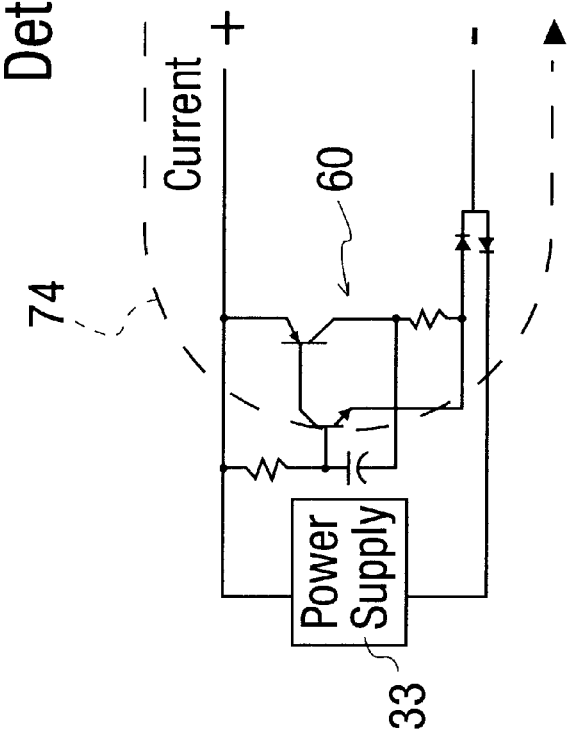
FIG. 5A is a circuit diagram showing the features of FIG. 4 with current flow shown schematically during a detection phase.

FIG. 5A schematically shows the current flow 74 through the indication circuitry 60. The indication circuitry 60 operates on voltages from 2.5 to 5 volts. The circuitry 60 alternates from near zero current to a programmable current draw. Based on the arrangement of the diode 72 (see FIG. 4) and the polarity of the applied voltage during the detection phase, shown in FIG. 5A, the load 33 is removed from the current path (the load 33 is e.g. an operational power supply). With the application of a voltage, preferably between 2.5 volts and 5 volts, the end device with circuitry 60 has a current draw profile which is distinctive.

Figure 5B:
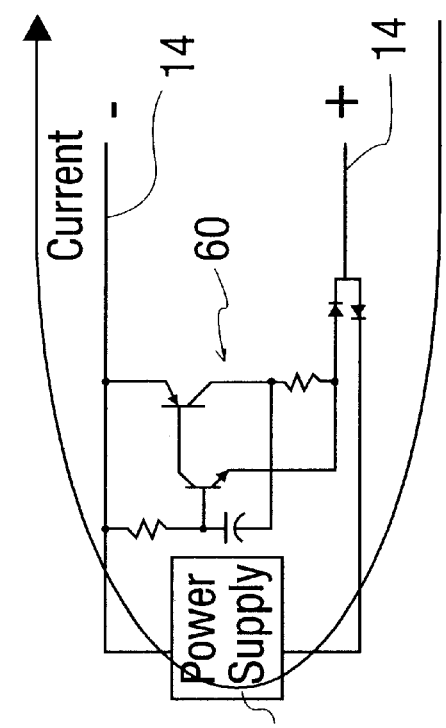
FIG. 5B is a circuit diagram showing the features of FIG. 4 with current flow shown schematically during an ope on phase.

In the operational phase at shown in FIG. 5B, the power source at the network side applies the power with a reverse polarity as compared to the detection phase. This is indicated by the plus (+) and minus (−) signs in FIG. 5B. In this case, the diode 72 (see FIG. 4) blocks current flow and the diode 74 (see FIG. 4) allows current flow through the operational power supply or load 33. By this arrangement the oscillator circuitry 60 is protected from power voltage (e.g. 48 volts used for operation) and current flows only through the power supply or load 33. However, the system also preferably monitors current flow to detect over and under draw conditions as discussed further below.

Figure 6:
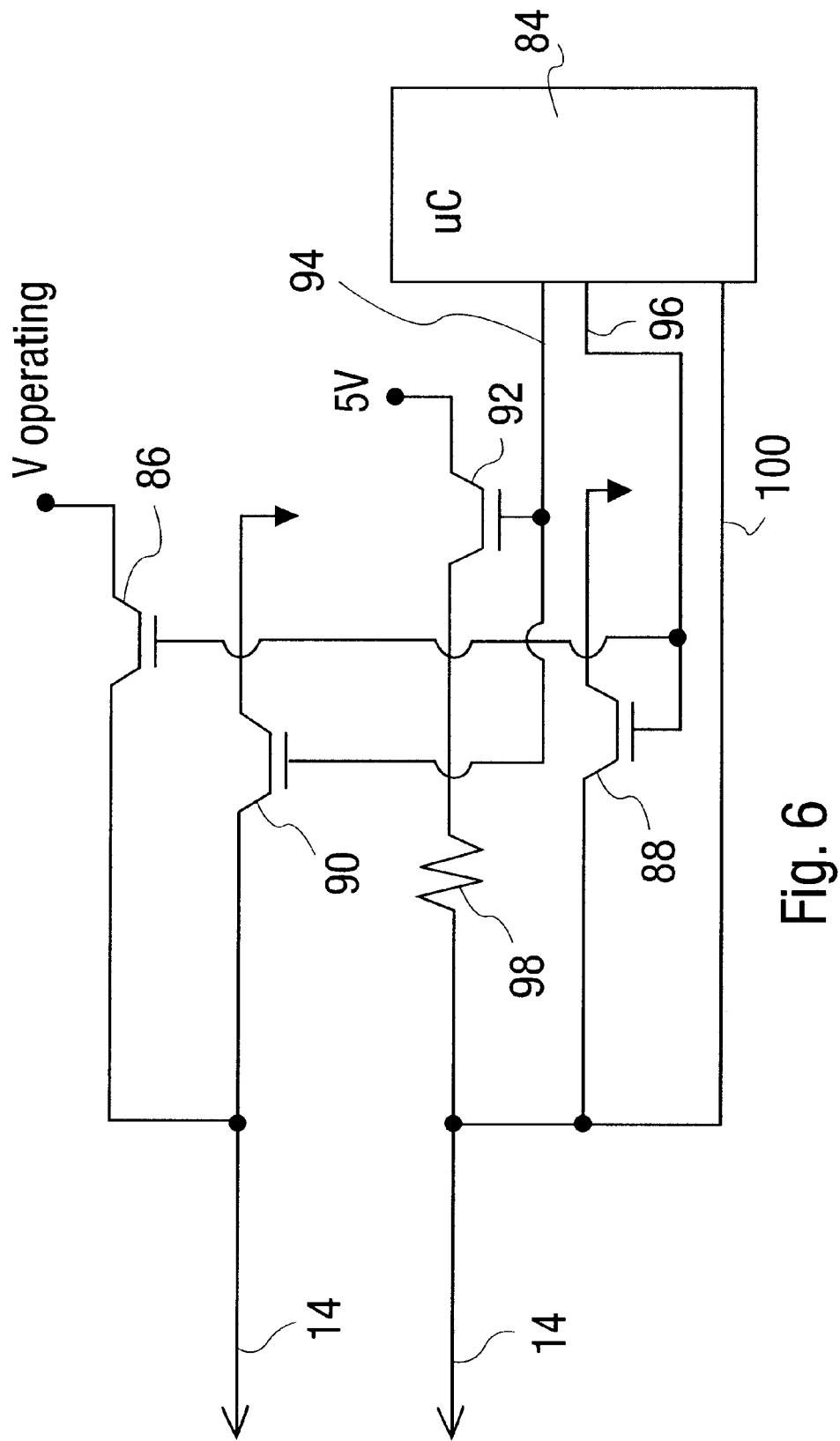
FIG. 6 is a circuit diagram showing inventive features associated with the network side (e.g., a hub/switch) of the system according to the second embodiment of the invention.
Figure 7A:
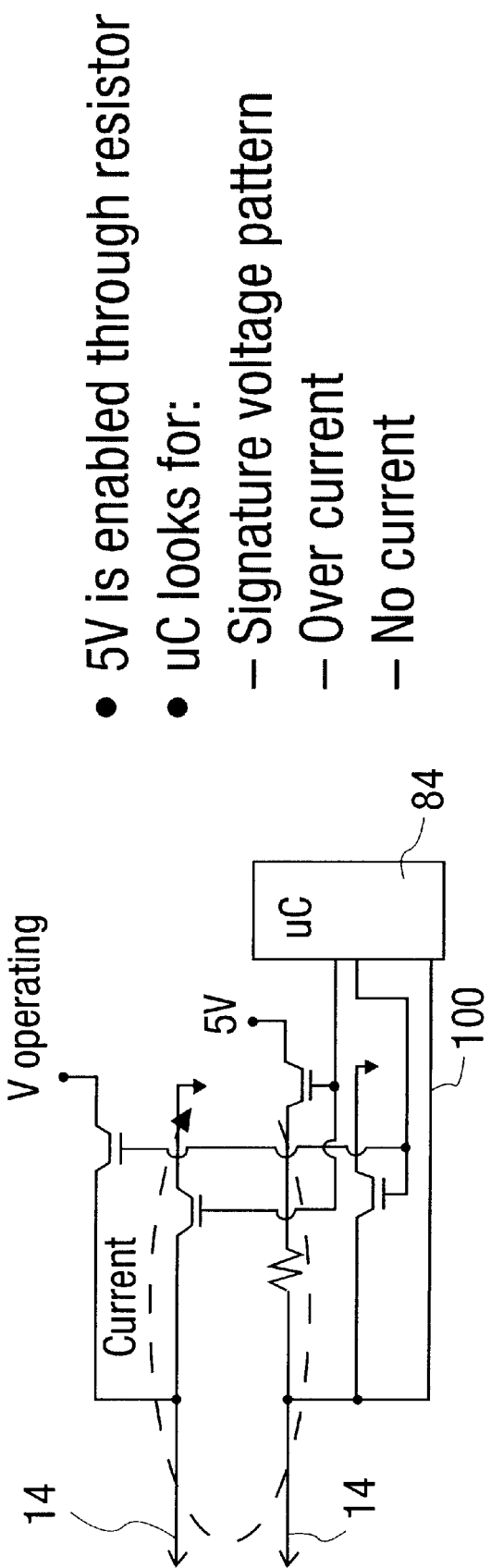
FIG. 7A is a circuit diagram showing features at the network side according to the second embodiment of the invention, with current flow shown schematically during the detection phase.
Figure 7B:
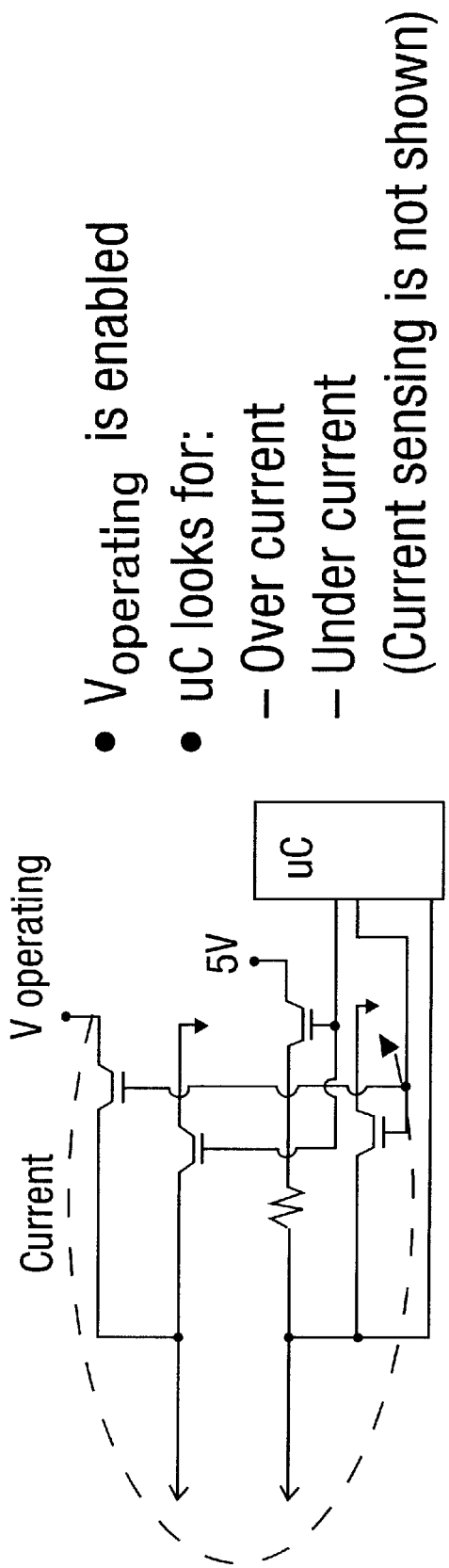
FIG. 7B is a circuit diagram showing features at the network side according to the second embodiment of the invention, with current flow shown schematically during the operation phase.

FIG. 6 shows the network side which includes a microcontroller 84 connected to two transistor arrangements. The first transistor arrangement includes a first field effect transistor (FET) 86 and a second FET 88. A second transistor arrangement is provided with a first FET 90 and a second FET 92. The microcontroller 84 provides control voltage signals via lines 94 and 96 based on the two transistor arrangements connected as shown. A resistor 98 is provided which may be for example 60 Ω. The network side also includes a sensing line 100. This network stimulus circuitry is connected to the ethernet wiring 14.

During the detection phase (illustrated in FIG. 7A) the microcontroller 84 enables five volts across the wiring 14 through resistor 98. During this detection phase the microcontroller 84 looks at sensing line 100 for a signature voltage pattern, such as the oscillating pattern resulting from the end device 12". The microcontroller 84 is also looking for an over current situation or a no current situation. In a situation where an end device 12" is connected to wiring 14 the sense line voltage oscillates between five volts, very little current is drawn, and 2 to 3 volts (2.5 to 3 volts) with a higher draw. At the end device 12" the circuitry 60 initially starts to charge the capacitor 70. While charging, the resistor 68 draws a small current over a longtime. During this, the transistors 64 and 62 are not turn on. As the capacitor 70 charges the transistor 62 and 64 start to turn on. When the capacitor 70 discharges there is a heavy current draw. The circuitry 69 oscillates between a low current draw and a large current draw while the diode 72 prevents any leakage current round flowing through the power supply or load 33 based on the polarity of the applied voltage at shown in FIG. 5A.

When the network side device 10 has detected the oscillating voltage at sense line 100, the detection phase is ended and the network side device 10 starts the operation phase (illustrated in FIG. 7B), to provide system power to end device 12". The operational voltage is enabled via the control line 96. This results in the provision of the operating voltage with a polarity which is reversed compared with the detection phase.

Figure 8:
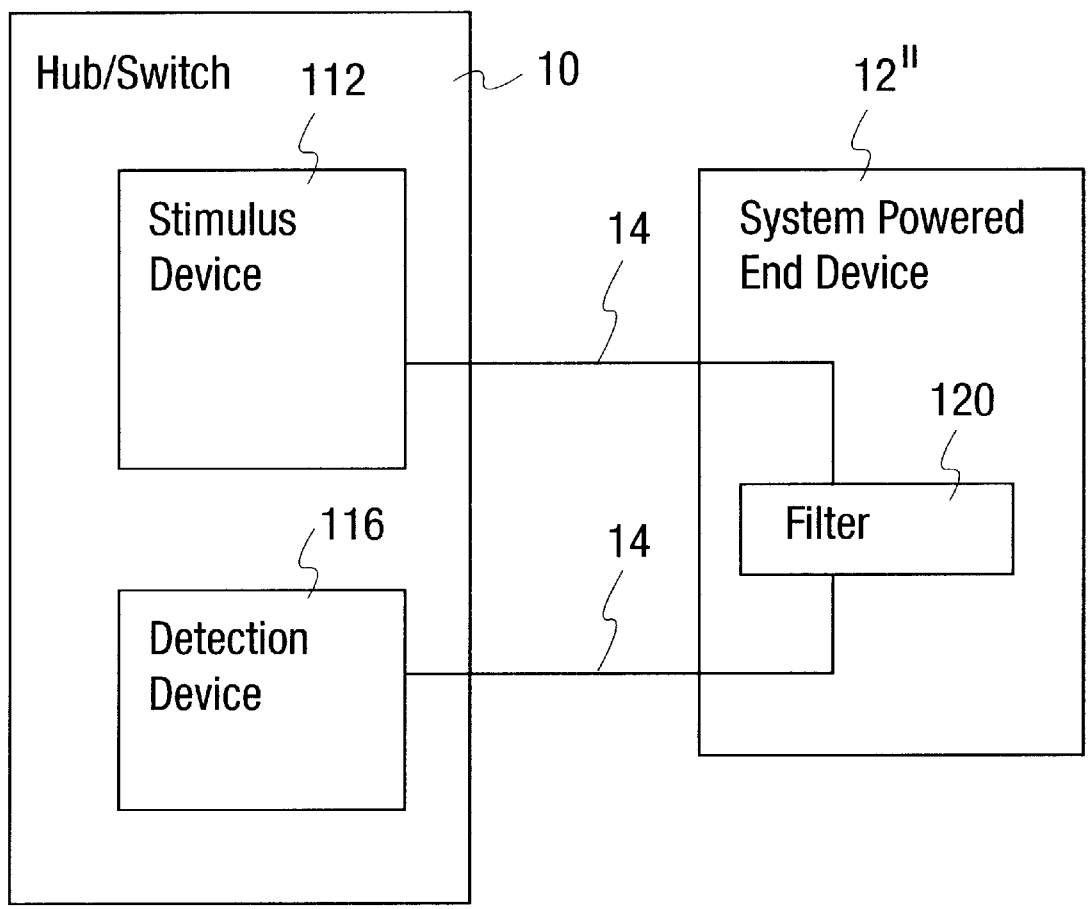
FIG. 8 is a circuit diagram showing features according to still another embodiment of the invention.

Still another embodiment of the invention is schematically shown in FIG. 8. This embodiment provides a system which uses a network side device such as a hub/switch 10 and may be connected by an Ethernet twisted pair wiring 14 to an end device 12. In order to account for end devices 12' that use local power, the network device 10 is provided with a stimulus device 112 and a detection device 116. The stimulus device is provided such that the stimulus (e.g. a tone, one or more frequencies, an oscillating pattern, etc.) will not damage end devices 12' that use local power. Additionally, this system is provided such that the indication provided by system powered end devices 12" will not be the same as the initial stimulus. As with all of the embodiments, this is preferred as this avoids the possibility of two network devices issuing stimulus signals and then trying to power each other.

According to this embodiment of the invention the system power end device 12" is provided with a system element 120 which allows the stimulus signal to be sent back to the network side 10 but only after it is conditioned. According to this embodiment the stimulus may be for example a 1 kHz tone followed by 4 kHz tone wherein this is repeated during the detection phase. The system element 120 is provided as a filter to filter out all or part of one component of the stimulus signal. For example, a band pads filter 120 can be provided to pass the 1 kHz tone and to clip the 4 kHz tone.

While specific embodiments of the invention have been shown and described in detail to illustrate the application of the principles of the invention, it will be understood that the invention may be embodied otherwise without departing from such principles.

What is claimed is:

1. A network system comprising:
    a network device having ports;
    wiring defining network connection lines for carrying data signals;
    a plurality of end devices, each end device being connected to ports of said network device via respective network connection lines, said end devices including at least one of a system powered end device, requiring power via said network connection lines and a locally powered end device, not requiring power via said network connection lines.

2. The system according to claim 1, wherein said system powered end device includes a load and said indication device isolates said load during said detection phase.

3. The system according to claim 1, wherein said stimulus device is associated with a power source for powering said system powered end device during an operation phase.

4. The system according to claim 3, wherein said stimulus device and said detection device are isolated from said power source during said detection phase.

5. The system according to claim 1, wherein said stimulus device and said detection device include common circuitry.

6. A system to power twisted pair wires carrying Ethernet data signals, the system comprising:
  a hub/switch;
  Ethernet twisted pair wiring;
  a variable power source with current sense for providing a power voltage during a power phase and for oscillating between a first low voltage and a second low voltage during a pre-power phase, said variable power source being associated with said hub/switch for supplying said first low voltage and said second low voltage, for supplying a power voltage over said twisted pair wires carrying Ethernet data signals and for detecting current draw in the twisted pair wires carrying Ethernet data;
  a device connectable to the hub/switch via the twisted pair wires carrying Ethernet data signals, said device having circuitry for allowing current flow at said second low voltage and for substantially not allowing current flow at said first low voltage whereby said current sense of said power source senses an expected current draw behavior to indicate the device is to be powered by said power source.

7. The system according to claim 6, wherein said circuitry for allowing current flow at said second low voltage and for substantially not allowing current flow at said first low voltage includes a Zener diode selected based on said first low voltage and a second low voltage.

8. The system according to claim 6, further comprising a standard end device connectable with hub/switch via the twisted pair wires carrying Ethernet data signals, said standard end device including a passive resistor termination to an associated twisted pair wires carrying Ethernet data signals.

9. An Ethernet system comprising:
  a hub/switch;
  Ethernet twisted pair wiring for carrying data signals;
  a plurality of end devices connected by said Ethernet twisted pair wiring to said hub/switch, each end device being one of:
    a standard end device connectable with said hub/switch via the twisted pair wires carrying Ethernet data signals, said standard end device including a passive resistor termination to an associated twisted pair wires carrying Ethernet data signals and
    a system powered device connectable to the hub/switch via the twisted pair wires carrying Ethernet data signals, said system powered device providing a nonlinear current draw upon a voltage oscillating between a first low voltage and a second low voltage being applied to said system powered end device for indicating the system power need to said hub; and
  a power source for selectively supplying system power over said Ethernet twisted pair wiring, said power source being a variable power source with a power off state in which said variable power source oscillates between said first low voltage and said second low voltage said power source being associated with said hub and detecting said nonlinear current draw upon said voltage oscillating between said first low voltage and said second low voltage being applied to said system powered end device to indicate the system power need and supplying system power to each of said end devices that is a system powered device and for not supplying system power to each of said end devices that is a standard device.

10. The system according to claim 9, wherein the system power is above 5V and the Ethernet twisted pair wiring for carrying data signals carries the system power as a component with a series superimposed communication pulse component for Ethernet twisted pair wiring connected to a system powered device.

11. The system according to claim 10, wherein the Ethernet twisted pair wiring for carrying data signals carries a signal including a 60 Hz ISO 48V potential component and a series superimposed communication pulse (e.g. +/−2V) component.

12. The system according to claim 9, wherein said system powered device provides a nonlinear current draw with circuitry for allowing current flow at said second low voltage and for substantially not allowing current flow at said first low voltage; and said power source detects said indication of the system power need with current sense circuitry which senses a current draw which is non linear, based on said system powered device circuitry allowing current flow at said second low voltage and substantially not allowing current flow at said first low voltage to indicate the device is to be powered by said power source.

13. The system according to claim 12, wherein said circuitry for allowing current flow at said second low voltage and for substantially not allowing current flow at said first low voltage includes a Zener diode selected based on said first low voltage and a second low voltage.

14. A process for selectively providing system power to end devices using Ethernet twisted pair wiring, the process comprising the steps of:
  providing a hub/switch including a power source having a detecting state oscillating between a first low voltage and a second low voltage;
  providing Ethernet twisted pair wiring for carrying data signals;
  connecting a plurality of end devices to the hub/switch with the Ethernet twisted pair wiring, each of the devices being one of
    a standard end device connectable with said hub/switch via the twisted pair wires carrying Ethernet data signals, the standard end device including a passive resistor termination to an associated twisted pair wires carrying Ethernet data signals and
    a system powered device connectable to the hub/switch via the twisted pair wires carrying Ethernet data signals, said system powered device providing a nonlinear current draw upon a voltage oscillating between the first low voltage and the second low voltage being applied to said system powered end device for indicating the system power need to said hub;
  detecting said nonlinear current draw at the hub/switch upon said voltage oscillating between said first low voltage and said second low voltage being applied to said system powered end device to indicate the system power need; and
  supplying system power to each of the end devices that is a system powered device and for not supplying system power to each of said end devices that is a standard device based on the detected indication.

15. The process according to claim 14, wherein the system power is above 5V and the Ethernet twisted pair wiring for carrying data signals carries the system power as a component with a series superimposed communication pulse component for Ethernet twisted pair wiring connected to a system powered device.

16. The process according to claim 15, wherein the Ethernet twisted pair wiring for carrying data signals carries a signal including a 60 Hz ISO 48V potential component and a series superimposed communication pulse (e.g. +/−2 V) component.

17. The process according to claim 14, wherein said power source is a variable power source with the detecting state in which it oscillates between providing the first low voltage and providing the second low voltage, said variable power source supplying the first low voltage and the second low voltage and wherein said system powered device includes circuitry for allowing current flow at said second low voltage and for substantially not allowing current flow at said first low voltage to provide the indication.

18. The process according to claim 17, wherein said power source detects said indication of the system power need with current sense circuitry which senses a current draw which is non linear, based on said system powered device circuitry allowing current flow at said second low voltage and substantially not allowing current flow at said first low voltage to indicate the device is to be powered by said power source.

19. The process according to claim 16, wherein said power source enters said power off state either by default or the state is entered upon detecting a connection condition at an end device side.

20. The process according to claim 14, wherein the second voltage is greater than the first low voltage.

* * * * *

UNITED STATES PATENT AND TRADEMARK OFFICE
CERTIFICATE OF CORRECTION

PATENT NO.     : 6,535,983 B1
DATED          : March 18, 2003
INVENTOR(S)    : McCormack et al.

It is certified that error appears in the above-identified patent and that said Letters Patent is hereby corrected as shown below:

Column 10,
Lines 54-64, please replace claim 1 with the following:
-- 1. A network system comprising:
   a network device having ports;
   wiring defining network connection lines for carrying data signals;
   a plurality of end devices, each end device being connected to ports of said network device via respective network connection lines, said end devices including at least one of a system powered end device, requiring power via said network connection lines and a locally powered end device, not requiring power via said network connection lines;
   a stimulus device associated with said network device, for sending a stimulus signal over said network connection lines during a detection phase, the stimulus signal having a stimulus voltage oscillating between two voltage levels which are less than or equal to about 5 Volts;
   an indication device associated with said system powered end device, said indication device for providing a nonlinear current draw upon the voltage oscillating between two voltage levels being applied to said system powered end device; and
   a current sense detector associated with said network device, said detector for detecting an expected current draw behavior upon the voltage oscillating between two voltage levels being applied to said system powered end device. --

Signed and Sealed this

Eighteenth Day of November, 2003

JAMES E. ROGAN
*Director of the United States Patent and Trademark Office*